United States Patent [19]

Petersen

[11] 4,202,801

[45] May 13, 1980

[54] THERMOPLASTIC ELASTOMER COMPOSITION

[75] Inventor: Henno A. Petersen, Newtown, Conn.

[73] Assignee: Uniroyal, Inc., New York, N.Y.

[21] Appl. No.: 866,184

[22] Filed: Dec. 30, 1977

[51] Int. Cl.² ............ C08L 7/00; C08L 9/00; C08L 11/00; C08L 47/00

[52] U.S. Cl. .................... 260/5; 260/4 R; 260/33.6 AQ; 525/232; 525/237

[58] Field of Search .......... 260/4 R, 5, 889, 33.6 AQ; 525/232, 237

[56] References Cited

U.S. PATENT DOCUMENTS

| | | | |
|---|---|---|---|
| 3,356,764 | 12/1967 | Gentile | 260/889 |
| 3,419,639 | 12/1968 | Gentile | 260/889 |
| 3,428,581 | 2/1969 | Purper | 260/5 |
| 3,491,167 | 1/1970 | Soldatos | 260/889 |
| 3,665,059 | 5/1972 | Mahlman | 260/889 |
| 3,725,330 | 4/1973 | Shirato et al. | 260/889 |
| 3,758,643 | 9/1973 | Fischer | 260/897 A |
| 3,806,558 | 4/1974 | Fischer | 260/897 A |
| 3,830,274 | 8/1974 | Waser | 260/4 R |
| 3,830,881 | 8/1974 | Woods et al. | 260/889 |
| 3,835,201 | 9/1974 | Fischer | 260/897 A |
| 3,862,106 | 1/1975 | Fischer | 260/897 A |
| 3,891,724 | 6/1975 | Yaeda et al. | 260/889 |
| 3,897,405 | 7/1975 | Son et al. | 260/889 |
| 3,957,919 | 5/1976 | Von Bodungen et al. | 260/897 A |
| 4,003,420 | 1/1977 | Sandstrom et al. | 260/4 R |
| 4,004,627 | 1/1977 | Sandstrom et al. | 260/4 R |
| 4,006,116 | 2/1977 | Dominguez | 260/33.6 AQ |
| 4,008,190 | 2/1977 | Taylor et al. | 260/5 |
| 4,104,210 | 8/1978 | Coran et al. | 260/889 |
| 4,108,947 | 8/1978 | Kimura et al. | 260/889 |
| 4,130,534 | 12/1978 | Coran et al. | 260/889 |

FOREIGN PATENT DOCUMENTS

| | | | |
|---|---|---|---|
| 38-2126 | 3/1963 | Japan | 260/889 |
| 49-15044 | 4/1974 | Japan | 260/889 |
| 951024 | 3/1964 | United Kingdom | 260/889 |

*Primary Examiner*—Allan Lieberman
*Attorney, Agent, or Firm*—Paul H. Ginsburg

[57] ABSTRACT

Dynamically partially cured blends of monoolefin copolymer rubber with a polyolefin resin and a conjugated diene rubber are thermoplastic and can be fabricated into useful articles by conventional processing methods such as injection molding or extrusion.

32 Claims, No Drawings

THERMOPLASTIC ELASTOMER COMPOSITION

BACKGROUND OF THE INVENTION

This invention relates to a blend of polymers which has the characteristics of a thermoplastic elastomer.

Thermoplastic blends of partially cured monoolefin copolymer rubber with a polyolefin plastic, which exhibit elastomeric properties, are known (U.S. Pat. Nos. 3,758,643; 3,806,558; and 3,862,106 to Fischer, the disclosure of which is hereby incorporated by reference, issued Sept. 11, 1973; Apr. 23, 1974; and Jan. 21, 1975 respectively). Generally, such materials have not included additional elastomeric materials, and hence their performance, as measured by certain physical properties, has been limited.

The present invention is based on the discovery that the addition of a conjugated diene rubber to a blend of monoolefin copolymer rubber and polyolefin resin, followed by partial cure, unexpectedly results in a thermoplastic elastomeric composition which exhibits the highly desirable properties of low compression set and high tensile strength at elevated temperatures.

SUMMARY OF THE INVENTION

The present invention relates to a dynamically partially cured blend of monoolefin copolymer rubber, such as saturated EPM (ethylene-propylene copolymer rubber) or unsaturated EPDM (ethylene-propylene-non-conjugated diene terpolymer rubber), polyolefin resin, such as polyethylene or polypropylene, and conjugated diene rubber, such as cis-1,4-polyisoprene (whether synthetic or natural, as in natural rubber), or cis-polybutadiene, or polychloroprene (also called Neoprene). Such a blend is thermoplastic and can be fabricated into useful articles by conventional processing methods, for example by injection molding or extrusion, and the present invention also relates to such articles.

As they are similar to typical thermoplastic materials, the blends of the present invention can be reprocessed and they do not require an expensive and time-consuming vulcanization step in order to develop good physical properties.

The present invention also relates to a method of preparing a thermoplastic elastomer comprising dynamically partially curing a mixture of monoolefin copolymer rubber, such as saturated EPM (ethylene-propylene copolymer rubber) or unsaturated EPDM (ethylene-propylene-non-conjugated diene terpolymer rubber), polyolefin resin, such as polyethylene or polypropylene, and conjugated diene rubber, such as cis-1,4-polyisoprene (whether synthetic or natural, as in natural rubber), or cis-polybutadiene, or polychloroprene (also called Neoprene). The present invention also relates to thermoplastic elastomers prepared according to said method.

"Dynamically partially curing", as used herein, means that the materials comprising a mixture are masticated or sheared, as in a Banbury mixer or on a roll mill, while being subjected to curing conditions. The cure thus imparted under dynamic conditions is only partial. That is, the blend does not become cross-linked to the extent that it will no longer knit together into a coherent mass on conventional rubber or plastic processing machinery.

DESCRIPTION OF THE PREFERRED EMBODIMENTS

The monoolefin copolymer rubber employed in the blend of the invention is an amorphous, random, elastomeric copolymer of two or more monoolefins, with or without a copolymerizable polyene. Usually two monoolefins are used, but three or more may be used. Ordinarily one of the monoolefins is ethylene while the other is preferably propylene. However other alpha-monoolefins may be used including those of the formula $CH_2=CHR$ where R is an alkyl radical having for example one to 12 carbon atoms (e.g., butene-1, pentene-1, hexene-1, 4-methylpentene-1, 5-methylhexene-1, 4-ethylhexene-1, etc.). While the monoolefin copolymer rubber may be a saturated material, as in ethylene-propylene binary copolymer rubber ("EPM") it is ordinarily preferred to include in the copolymer a small amount of at least one copolymerizable polyene to confer unsaturation on the copolymer. In practice it is usual to employ for this purpose a nonconjugated diene, including the open-chain non-conjugated diolefins such as 1,4-hexadiene (See. U.S. Pat. No. 2,933,480 Gresham et al., Apr. 19, 1960) or a cyclic diene, especially a bridged ring cyclic diene, as in dicyclopentadiene (See U.S. Pat. No. 3,211,709, Adamek et al., Oct. 12, 1965), or an alkyl-idenenorbornene as in methylenenorbornene or ethylidenenorbornene (See U.S. Pat. No. 3,151,173, Nyce, Sept. 29, 1964), as well as cyclooctadiene, methyltetrahydroindene, etc. (see also such U.S. Pat. Nos. as 3,093,620 and 3,093,621; also 3,538,192 col. 6, line 49 to col. 7, line 51). The polyenes employed are not limited to those having only two double bonds, but include those having three or more double bonds.

The conjugated diene rubbers employed in the blend of the invention are the natural or synthetic rubbers which have high olefinic unsaturation and which are conventionally vulcanized with sulfur. Such synthetic rubbers are the homopolymers of aliphatic conjugated diolefin hydrocarbons and copolymers of such diolefins with monoolefinic compounds copolymerizable therewith. Such aliphatic diolefin hydrocarbons include butadiene-1,3; isoprene; piperylene; chloroprene; and 2,3-dimethylbutadiene-1,3. The monoolefins include styrene; alphamethylstyrene; p-methylstyrene; alpha, p-dimethylstyrene; acrylic and methacrylic nitriles, amides, acids and esters; vinyl pyridines; fumaric esters; methylenemalonic esters; vinylidene chloride; methyl vinyl ketone; and methyl isopropenyl ketone. Mixtures of such monoolefinic compounds can also be copolymerized with the diolefin. The term "high olefinic unsaturation" here connotes an amount of unsaturation on the order of that occurring in Hevea rubber.

The polyolefin resin with which the monoolefin copolymer rubber and conjugated diene rubber are mixed to make the blend of the invention is a solid, high molecular weight resinous plastic material made by polymerizing such olefins as ethylene, propylene, butene-1, pentene-1, 4-methyl-pentene, etc., in conventional manner. Thus, such crystalline polyolefins as polyethylene (either of the low density [e.g., 0.910–0.925 g/cc], medium density [0.926–0.940 g/cc] or high density [e.g., 0.941–0.965 g/cc] type) may be used, whether prepared by high pressure processes or low pressure processes, including linear polyethylene. Polypropylene is a preferred polyolefin resin, having highly crystalline isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see "Polyolefins," N.V. Boenig, Elsevier Publishing Co., N.Y., 1966).

As indicated, an important feature of the invention resides in semi-curing the monoolefin copolymer and conjugated diene rubbers which are included in the blend. For this purpose any conventional curative or radiation may generally be employed. Examples of conventional curatives include such free-radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g., diacetylperoxide, dibenzoylperoxide, bis-2,4-dichlorobenzoylperoxide, di-tert-butylperoxide, dicumylperoxide, tert-butylperbenzoate, tert-butylcumylperoxide, 2,5-bis(tert-butylperoxy)-2,5-dimethylhexane, 2,5-bis-(tert-butylperoxy)-2,5-dimethylhexyne-3; 4,4,4',4'-tetra-(tert-butylperoxy)-2,2-dicyclohexylpropane, 1,4-bis-(tert-butylperoxyisopropyl)-benzene, 1,1-bis-(tert-butylperoxy)3,3,5-trimethylcyclohexane, lauroyl peroxide, succinic acid peroxide, cyclohexanone peroxide, tert-butyl peracetate, butyl hydroperoxide, etc. Also suitable are the azide types of curing agents including such materials as the azidoformates (e.g., tetramethylenebis (azidoformate); for others see U.S. Pat. No. 3,284,421, Breslow, Nov. 8, 1966), aromatic polyazides (e.g., 4,4'-diphenylmethan diazide; for others see U.S. Pat. No. 3,297,674, Breslow et al., Jan. 10, 1967), and sulfonazides such as p,p'-oxybis(benzene solfonyl azide), etc. Other curatives that may be used include the aldehydeamine reaction products such as formaldehyde-ammonia formaldehyde-ethylchloride-ammonia, acetaldehyde-ammonia, formaldehyde-aniline, butyraldehyde-aniline, heptaldehyde-aniline, heptaldehyde-formaldehyde-aniline, hexamethylenetetramine, alpha-ethyl-beta-propyl-acrolein-aniline; the substituted ureas (e.g., trimethylthiourea, diethylthiourea, dibutylthiourea, tripentylthiourea, 1,3-bis(2-benzothiazolylmercaptomethyl)urea, and N,N-diphenylthiourea); guanidines (e.g., diphenylguanidine, di-o-tolylguanidine, diphenylguanidine phthalate, and di-o-tolylguanidine salt of dicatechol borate); xanthates (e.g., zinc ethylxanthate, sodium isopropylxanthate, butylxanthic disulfide, potassium isopropylxanthate, and zinc butylxanthate; dithiocarbamates (e.g., copper dimethyl-, zinc dimethyl-, tellurium diethyl-, cadmium dicyclohexyl-, lead dimethyl-, selenium dibutyl-, zinc pentamethylene-, zinc didecyl-, and zinc isopropyloctyl-, dithiocarbamate); thiazoles (e.g., 2-mercaptobenzothiazole; zinc mercaptothiazolyl mercaptide, 2-benzothiazolyl-N,N-diethylthiocarbamyl sulfide, and 2,2'-dithiobis(benzothiazole); imidazoles (e.g., 2-mercaptoimidazoline and 2-mercapto-4,4,6-trimethyldihydropyrimidine); sulfenamides (e.g., N-t-butyl-2-benzothiazole-, N-cyclohexylbenzothiazole-, N,N-di-isopropylbenzothiazole-, N-(2,6-dimethylmorpholino)-2-benzothiazole-, and N,N-diethylbenzothiazole-sulfenamide); thiuramdisulfides (e.g., N,N'-diethyl-, tetrabutyl-, N,N'-di-isopropyldioethyl-, tetramethyl-, N,N'-dicyclohexyl-, and N,N'-tetralauryl- thiuramdisulfide); also paraquinonedioxime, dibenzoparaquinonedioxime, etc. as well as sulfur itself (see Encyclopedia of Chemical Technology, Vol. 17, 2nd edition, Interscience Publishers, 1968; also Organic Peroxides, Daniel Severn, Vol. 1, Wiley-Interscience, 1970). The peroxide curative may be used alone, or in conjunction with the usual auxiliary substances such as sulfur, maleimides including bis-maleimides, polyunsaturated compounds (e.g., cyanurate), acrylic esters (e.g., trimethylolpropanetrimethacrylate), etc. With sulfur curatives, such as sulfur itself or sulfur donors, it is usually desirable to include an accelerator of sulfur vulcanization as well as an activator (e.g., a metal salt or oxide), as in conventional practice. Mixed peroxide-type of mixed sulfur-type curing systems may be employed if desired such as dicumylperoxide plus 2,5-bis(-tert-butylperoxy)-2,5-dimethylhexane or sulfur plus tetramethylthiuramdisulfide. The preferred monoolefin copolymers having residual unsaturation, conferred by the presence of a polyene, such as EPDM, afford the widest choice of curatives. Reference may be had to "Vulcanization and Vulcanizing Agents," W. Hoffman, Palmerton Publishing Co., New York, 1967, for an extensive disclosure of curing agents.

The relative proportions of monoolefin copolymer rubber, conjugated diene rubber, and polyolefin resin employed in the blends of the invention may vary widely. When expressed as percent of the total composition by weight, the level of monoolefin copolymer rubber may vary from 10% to 80% (preferably 20% to 60%), the level of conjugated diene rubber may vary from 10% to 80% (preferably 20% to 60%), and the level of polyolefin resin may vary from 5% to 50% (preferably 10% to 40%). More than one monoolefin copolymer rubber, conjugated diene rubber, and polyolefin resin may be used in combination.

Any suitable other desired ingredients may be present, such as particulate or fibrous fillers (non-limiting examples are calcium carbonate, carbon black, silica, glass, asbestos, clay, talc.), oils (non-limiting examples are extender and process oils, whether derived from petroleum, obtained from other natural sources or manufactured synthetically, examples of extender and process oils being paraffinic oils and naphthenic oils) pigments, processing aids or lubricants, mold release agents, u.v. screening agents, antioxidants or stabilizers for the rubber or resin or both, etc. Any conventional antioxidant or stabilizer may be used, including, by way of non-limiting example, amine types, phenolic types, sulfides, phenyl alkanes, phosphites, etc. Representative materials are listed in "Rubber: Natural and Synthetic," Stern, Palmerton Publishing Co., New York, 1967, especially at pages 244–256; see also "Chemistry and Technology of Rubber," Davis & Blake, Reinhold, New York, 1937, Chapter XII. Included are such materials as 2,2,4-trimethyl-1,2-dihydroquinoline, diphenylamine acetone condensate, aldol-alpha-naphthylamine, octylated diphenylamine, N-phenyl-N'-cyclohexyl-p-phenylenediamine, 2,6-di-tert-butyl-4-methylphenol, styrene-resorcinol resin, o-cresolmonsulfide, di-p-cresol-2-propane, 2,5-di-tert-amylhydroquinone, dilauryl-3,3'-thiodipropionate and similar dialkyl thiodipropionates, etc.

Usually, the following procedure is applied in carrying out the invention.

(1) The monoolefin copolymer elastomer, the conjugated diene rubber, the poly-olefin resin, the curing agent, and if so desired, other additives such as oil, pigment or filler, are charged at the desired ratio to a suitable mixer such as a Banbury internal mixer, transfer-type extruder-mixer, compounding extruder, extruder or any such device that will enable efficient mastication at the desired temperature. Such blending apparatus may be preheated to reduce the time required to reach a processing temperature range, provided that such preheating temperature is below the decomposition temperature of the curing agent used.

(2) While mixing, the temperature is increased to above the decomposition temperature of the curing agent and usually the mix is held at such a temperature, while continuing the mixing for a time period long enough to ensure at least 95% decomposition of the curing agent, based on its theoretical half life at said temperature, and thorough mixing of the blend.

(3) After having processed the blend to a degree described under (2), an antioxidant is added to the blend and processing is continued usually for one minute or more in order to thoroughly incorporate the antioxidant in the blend for the purpose of deactivating any residual curing agent and enhanced protection against oxidative degradation of the composition.

(4) If so desired, the resultant product may be refined on a mill before being used to form shaped articles by means of extrusion, injection molding, press molding or any suitable means of manufacture.

As indicated, processability, and particularly reprocessability, is an important characteristic of the blends of the invention. The processability of the blends may be evaluated by subjecting samples of the blend to such shaping operations as extrusion, injection molding, or compression molding, as described in the examples below. Extrusion is the shaping method of choice where long continuous forms, such as hose, window seals, wire coatings, flat sheets, etc. are desired. For satisfactory screw injection molding the material must form a homogeneous article of uniform strength in the mold. The flow viscosity characteristics of such blends are adequate to insure filling the mold under the operating conditions. The most highly semicured blends of the invention are ordinarily best shaped by press molding.

Heretofore, certain desirable characteristics such as low compression set and good tensile properties at elevated temperatures have largely been obtainable only in vulcanized elastomers, which do not possess the added qualities of being thermoplastic and reprocessable. Such low compression set results in good recoverability from deformation of the material and a resilient "feel" to articles made therefrom which approach the characteristics of vulcanized elastomers. On the other hand, thermoplastic elastomers based on only a single elastomeric rubber (as in U.S. Pat. No. 3,806,558) could be molded rapidly and scrap could be reprocessed, but compression set was unacceptably high for certain applications, i.e., above 40%, and typically above 50%, while high temperature tensile strength was usually poor, below 100 psi. The present partially cured blends of two elastomers and polyolefin plastic combine in one material the advantages of rapid moldability, reprocessability, and unexpectedly excellent performance with respect to compression set and tensile properties at high temperatures.

Standard physical test methods were used to document the material performance advantages which are realized by the invention. Compression set at 158° F. was measured by ASTM method D-395, and tensile properties at 250° F. by ASTM method D-412. Test pieces were normally cut out of flat slabs which had been injection molded from blends prepared according to the teachings of the invention.

When conventional curing techniques and conventional processing methods are used, the composition of the present invention have the properties set forth in Table I herein. As the ranges of properties are strongly affected by the method of processing, the use of unconventional processing techniques could result in products having different ranges of properties.

TABLE I

| Room Temperature (25° C.) Properties: | |
|---|---|
| Hardness, Shore A | 50 to 80 |
| Tensile Modulus, psi | 300 to 1000 |
| Tensile Strength, psi | 300 to 1500 |
| Maximum Elongation, % | 500 |
| 70° C. Properties | |
| Compression Set, % | 25 to 40 |
| 121° C. Properties | |
| Tensile Modulus, psi | 100 to 300 |
| Tensile Strength, psi | 100 to 300 |
| Maximum Elongation, % | 300 |

EXAMPLE 1

A series of blends was compounded in a Banbury internal mixer, following the general procedure described above. The monoolefin copolymer rubber employed in each blend (called EPDM-I) contained 49.5% ethylene, 45.5% propylene, and 5% dicyclopentadiene by weight; the Mooney viscosity, ML-4 at 257° F., was 60.

Two types of conjugated diene rubber were tested: synthetic cis-polyisoprene having a 96% cis content, Mooney viscosity ML (1+4) of 82 at 100° C., and containing a nonstaining stabilizer (in Blend No. 1 in Table II); and standard Malaysian rubber, Grade 5CV, commonly known as SMR-5CV (in Blend No. 2, in Table II). Three other elastomers, not of the conjugated diene type, were included for comparison to show that such materials do not operate to produce the advantages of the invention, namely low compression set and good tensile strength at high temperatures: butyl rubber, polyisobutylene, and chlorosulfurated polyethylene (Blend Nos. 3,4, and 5 in Table II). Finally, a control blend was prepared (No. 6 in Table II) in which EPDM rubber alone was utilized.

The polypropylene used was crystalline and had a melt flow of 4.0 (as measured by ASTM D123-58T, 230° C.).

All of the compositions were semi-cured with 2,5-bis(tert-butylperoxy)-2,5-dimethylhexane while undergoing mixing in the Banbury mixer at approximately 360° F.

The finished blends were mechanically ground at room temperature, and injection molded into 3"×4"×0.065" slabs at 400° F. The test data depicted in Table II were obtained from pieces that were cut from these slabs.

The test data in Table II clearly reveal the unique advantages obtained by using a combination of EPDM and conjugated diene rubber, as in Blends Nos. 1 and 2. Compression set at 70° C. is significantly lower, and tensile modulus and strength at 121° C. are substantially higher, than in Blends Nos. 3, 4, 5, and 6, in which other elastomers are used in combination with EPDM, or EPDM alone is used.

These improvements in properties at elevated temperatures, exemplified by Blends Nos. 1 and 2, are a significant advance in the art.

TABLE II

| Blend Number: | 1 | 2 | 3 | 4 | 5 | 6 |
|---|---|---|---|---|---|---|
| Ingredients (parts by weight): | | | | | | |
| EPDM | 40 | 40 | 40 | 40 | 40 | 80 |
| Cis-polyisoprene | 40 | — | — | — | — | — |
| SMR-5CV | — | 40 | — | — | — | — |
| Butyl rubber | — | — | 40 | — | — | — |
| Polysiobutylene | — | — | — | 40 | — | — |
| Chlorosulfonated polyethylene | — | — | — | — | 40 | — |
| Polypropylene | 20 | 20 | 20 | 20 | 20 | 20 |
| Paraffinic oil | 35 | 35 | 35 | 35 | 35 | 35 |
| Peroxide curative | 0.8 | 0.8 | 0.8 | 0.8 | 0.8 | 0.8 |
| Stabilizer | 1.3 | 1.3 | 1.3 | 1.3 | 1.3 | 1.3 |
| Room Temperature (250° C.) Properties: | | | | | | |
| Hardness, Shore A | 64 | 64 | 46 | 52 | 62 | 64 |
| Tensile Modulus, psi | 250 | 280 | 70 | 110 | 180 | 210 |
| Tensile Strength, psi | 550 | 550 | 130 | 200 | 230 | 570 |
| Maximum Elongation, % | 230 | 250 | 410 | 430 | 420 | 380 |
| 70° C. Properties: | | | | | | |
| Compression Set, % | 30 | 34 | 56 | 53 | 66 | 43 |
| 121° C. Properties: | | | | | | |
| Tensile Modulus, psi | 140 | 125 | 20 | 20 | 25 | 40 |
| Tensile Strength, psi | 210 | 200 | 30 | 35 | 45 | 80 |
| Maximum Elongation, % | 170 | 190 | 430 | 380 | 870 | 260 |

I claim:

1. A thermoplastic elastomer comprising a dynamically partially cured blend of 10% to 80% monoolefin copolymer rubber, said monoolefin copolymer being an amorphous, random, elastomeric copolymer of two or more monoolefins, at least one of said monoolefins being ethylene, 5% to 50% polyolefin resin, said resin being a solid, high molecular weight resinous plastic material, and 10% to 80% conjugated diene natural or synthetic rubber having an amount of unsaturation on the order of that occurring in Hevea rubber, wherein the percentages are percent by weight of the total composition, said blend being crosslinked only to an extent that will not prevent its becoming knit together into a coherent mass when processed on conventional rubber or plastic processing machinery.

2. A thermoplastic eleastomer according to claim 1, wherein the percentage of monoolefin copolymer rubber is 20% to 60%.

3. A thermoplastic elastomer according to claim 1, wherein the percentage of polyolefin resin is 10% to 40%.

4. A thermoplastic elastomer according to claim 1, wherein the percentage of conjugated diene rubber is 20% to 60%.

5. A thermoplastic elastomer according to claim 1, wherein the monoolefin copolymer rubber is ethylene-propylene copolymer rubber or ethylene-propylene-non-conjugated, diene terpolymer rubber.

6. A thermoplastic elastomer according to claim 5, wherein the non-conjugated diene is 5-ethylidene-2-norbornene or dicyclopentadiene.

7. A thermoplastic elastomer according to claim 1, wherein the polyolefin resin is prepared from at least one monomer having the formula CH$_2$=CHR wherein R is an alkyl radical having from one to twelve carbon atoms.

8. A thermoplastic elastomer according to claim 1, where in the polyolefin resin is polyethylene or polypropylene.

9. A thermoplastic elastomer according to claim 1, wherein the conjugated diene rubber is cis-1,4-polyisoprene, cis-poly-butadiene or polychloroprene.

10. A thermoplastic elastomer according to claim 1, wherein the blend is partially cured with a peroxide curative, an azide curative or a sulfur curative.

11. A thermoplastic elastomer according to claim 10, wherein the peroxide curative is 2,5-bis(tert-butylperoxy)-2,5-dimethylhexane.

12. A thermoplastic elastomer according to claim 1, also comprising an extender oil.

13. A thermoplastic elastomer according to claim 12, wherein the extender oil comprises at least one of a naphthenic or a paraffinic oil.

14. A thermoplastic elastomer according to claim 1, also comprising a filler.

15. A thermoplastic elastomer according to claim 14, also comprising an extender oil.

16. A thermoplastic elastomer according to claim 1, also comprising a stabilizer.

17. A method of preparing a thermoplastic elastomer comprising dynamically partially curing a mixture which comprises 10% to 80% monoolefin copolymer rubber, said monoolefin copolymer being an amorphous, random, elastomeric copolymer of two or more monoolefins, at least one of said monoolefins being ethylene, 5% to 50% polyolefin resin, said resin being a solid, high molecular weight resinous plastic material, and 10% to 80% conjugated diene natural or synthetic rubber, wherein the percentages are percentages by weight of the total composition, said blend being crosslinked only to an extent that will not prevent its becoming knit together into a coherent mass when processed on conventional rubber or plastic processing machinery.

18. A method according to claim 17, wherein the percentage of monoolefin copolymer rubber is 20% to 60%.

19. A method according to claim 17, wherein the percentage of polyolefin resin is 10% to 40%.

20. A method according to claim 17, wherein the percentage of conjugated diene rubber is 20% to 60%.

21. A method according to claim 17, wherein the monoolefin copolymer rubber is ethylene-propylene copolymer rubber or ethylene-propylene-non-conjugated diene terpolymer rubber.

22. A method according to claim 21, wherein the non-connugated diene is 5-ethylidene-2-norbornene or dicyclopentadiene.

23. A method according to claim 17, wherein the polyolefin resin is prepared from at least one monomer having the formula CH$_2$=CHR wherein R is an alkyl radical having from one to twelve carbon atoms.

24. A method according to claim 17, wherein the polyolefin resin is polyethylene or polypropylene.

25. A method according to claim 17, wherein the conjugated diene rubber is cis-1,4-polyisoprene, cis-polybutadiene or polychloroprene.

26. A method according to claim 17, wherein the blend is partially cured with a peroxide curative, an azide curative or a sulfur curative.

27. A method according to claim 26, wherein the peroxide curative is 2,5-bis(tert-butylperoxy)-2,5-dimethylhexane.

28. A method according to claim 17, wherein the mixture also comprises an extender oil.

29. A method according to claim 28, wherein the extender oil comprises at least one of a naphthenic or a paraffinic oil.

30. A method according to claim 17, wherein the mixture also comprises a filler.

31. A method according to claim 30, wherein the mixture also to comprises an extender oil.

32. A method according to claim 17, wherein the mixture also comprises a stabilizer.

* * * * *